United States Patent
Lee

(10) Patent No.: US 12,542,176 B2
(45) Date of Patent: Feb. 3, 2026

(54) MEMORY DEVICE AND METHOD OF OPERATING THE SAME

(71) Applicant: SK hynix Inc., Icheon-si (KR)

(72) Inventor: Hee Youl Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 323 days.

(21) Appl. No.: 18/319,240

(22) Filed: May 17, 2023

(65) Prior Publication Data

US 2024/0177766 A1 May 30, 2024

(30) Foreign Application Priority Data

Nov. 24, 2022 (KR) .......................... 10-2022-0159074

(51) Int. Cl.
*G11C 11/4096* (2006.01)
*G11C 11/4076* (2006.01)
*G11C 11/4099* (2006.01)

(52) U.S. Cl.
CPC ...... *G11C 11/4096* (2013.01); *G11C 11/4076* (2013.01); *G11C 11/4099* (2013.01)

(58) Field of Classification Search
CPC .................. G11C 11/4096; G11C 11/4099
See application file for complete search history.

(56) References Cited

U.S. PATENT DOCUMENTS

| 11,294,596 | B2 * | 4/2022 | Ji ........................ G06F 3/0679 |
| 2021/0065828 | A1 * | 3/2021 | Yu ...................... G11C 11/5628 |
| 2022/0238170 | A1 * | 7/2022 | Kang .................... G11C 29/50 |

FOREIGN PATENT DOCUMENTS

KR      1020210034274 A      3/2021

* cited by examiner

*Primary Examiner* — Amir Zarabian
*Assistant Examiner* — Anthony Thinh Tang
(74) *Attorney, Agent, or Firm* — WILLIAM PARK AND ASSOCIATES LTD.

(57) ABSTRACT

A memory device, and a method of operating the same, includes checking a first elapsed time between an end time of a program operation performed on a first page and a selection time when a second page is selected after the end time, comparing the first elapsed time with a reference time interval, and performing a dummy program operation on the second page when the first elapsed time is equal to or longer than the reference time interval.

16 Claims, 12 Drawing Sheets

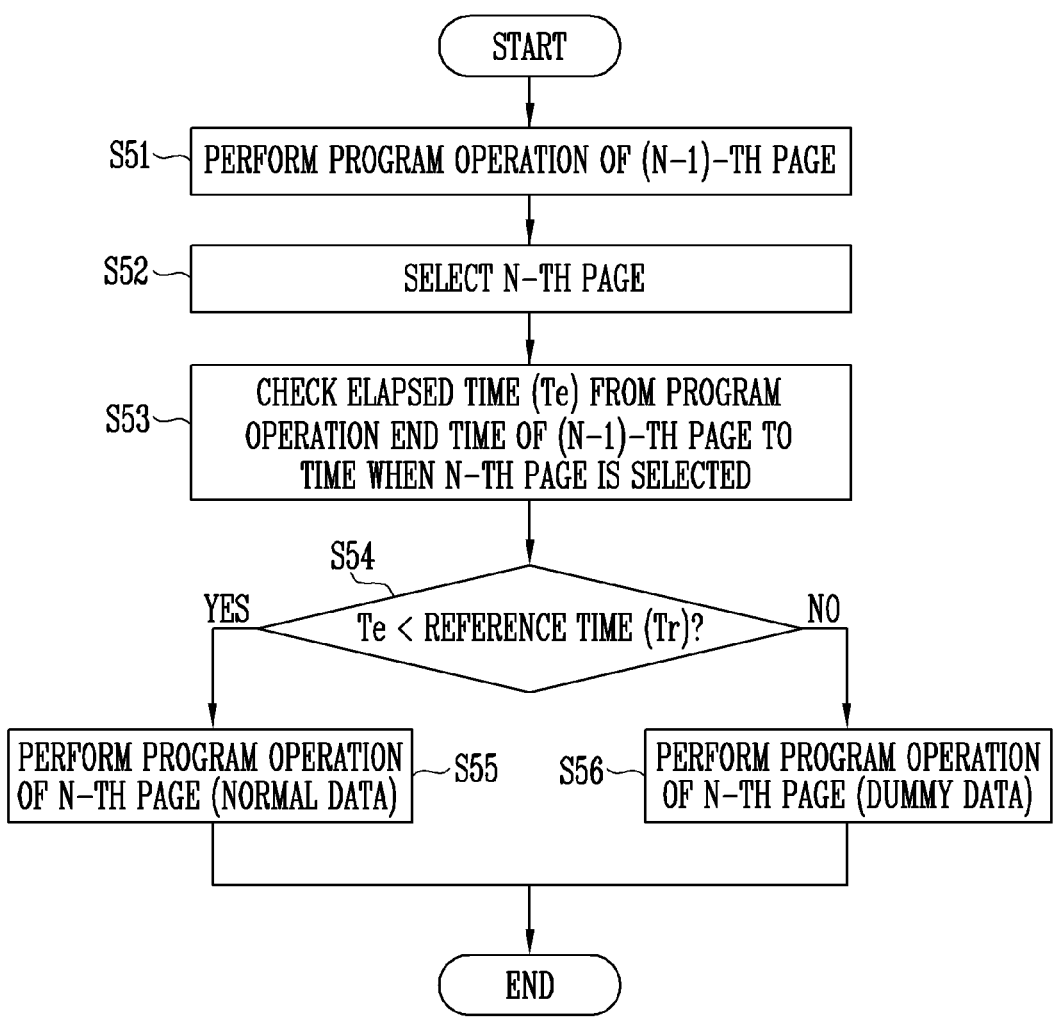

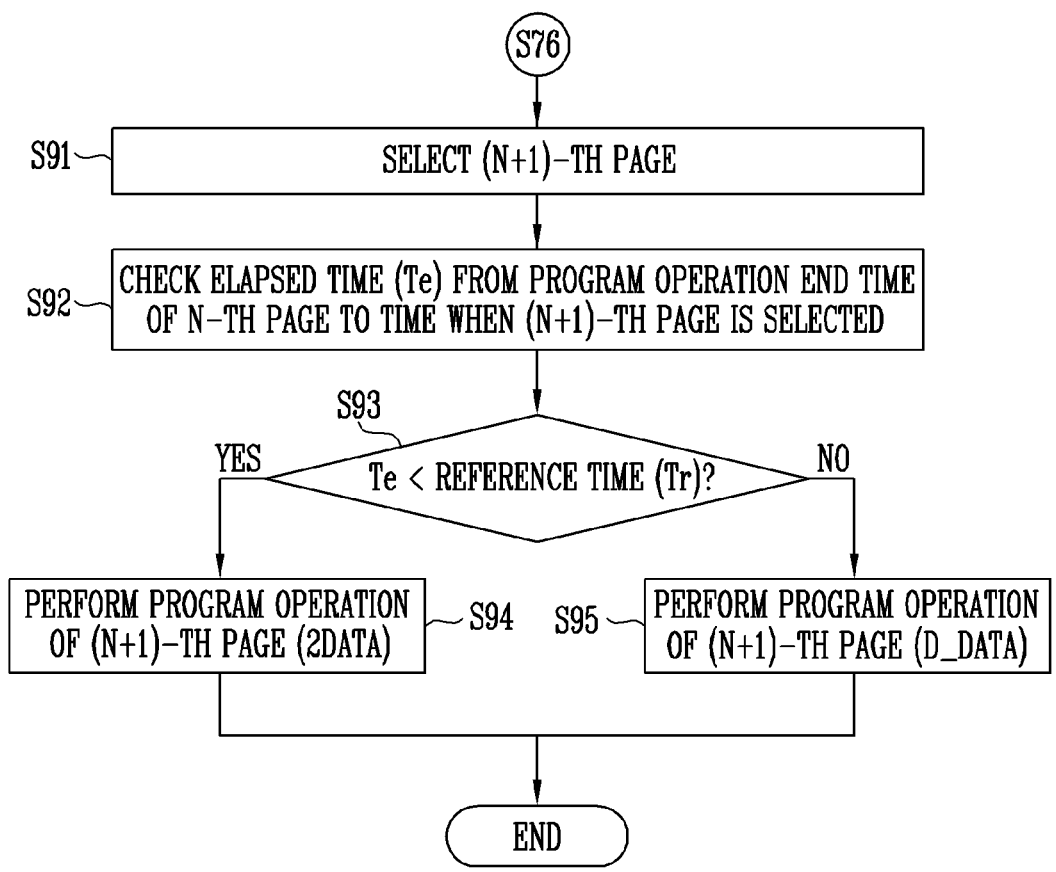

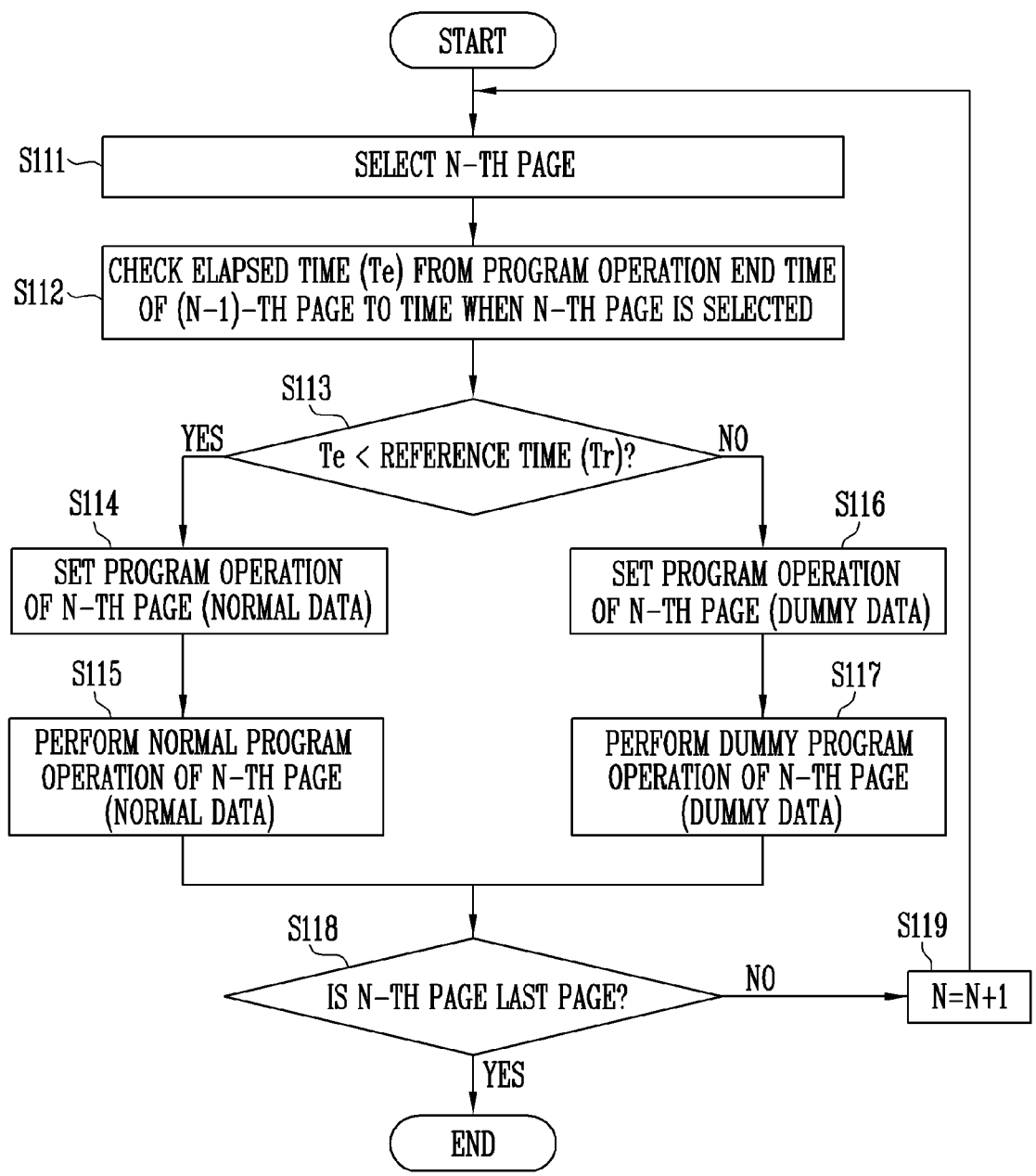

MEMORY DEVICE AND METHOD OF OPERATING THE SAME

CROSS-REFERENCE TO RELATED APPLICATION

The present application claims priority under 35 U.S.C. § 119(a) to Korean patent application number 10-2022-0159074 filed on Nov. 24, 2022, in the Korean Intellectual Property Office, the entire disclosure of which is incorporated by reference herein.

BACKGROUND

1. Technical Field

The present disclosure relates to a memory device and a method of operating the same, and more particularly, to a memory device and a method of operating the same configured to perform a program operation.

2. Related Art

A memory device may include a memory cell array in which data is stored, a peripheral circuit configured to perform a program, read, or erase operation, and a control circuit that controls the peripheral circuit.

The memory cell array may include a plurality of memory blocks, and each of the plurality of memory blocks may include a plurality of strings. Each of the strings may include memory cells. In a memory device formed in a three-dimensional structure, the strings may extend in a direction perpendicular to a substrate. Therefore, the memory cells may be stacked in a vertical direction on the substrate.

The peripheral circuit may be connected to the memory cell array through word lines and bit lines. The peripheral circuit may program, read, or erase the memory cells included in the memory cell array by adjusting voltages applied to the word lines and the bit lines.

The control circuit may control the peripheral circuit in response to a command and an address. The control circuit may include software configured to perform the program, read, or erase operation in response to the command. The control circuit may include hardware configured to divide the address into a row address and a column address and output various signals according to software control.

The memory cells may store 1 bit or more of data according to a program method. For example, memory cells may be programmed in a single-level cell (SLC) method, a multi-level cell (MLC) method, a triple-level cell (TLC) method, a quad-level cell (QLC) method, or the like. In the SLC method, 1 bit of data may be stored in the memory cell. In the MLC method, 2 bits of data may be stored in the memory cell. In the TLC method, three bits of data may be stored in the memory cell. In the QLC method, 4 bits of data may be stored in the memory cell. In addition to this, 5 bits or more of data may be stored in the memory cell.

As the number of bits of data stored in the memory cell increases, an interval between threshold voltages of the memory cells storing different data become narrow, and thus reliability of the memory device may be reduced.

SUMMARY

An embodiment of the present disclosure provides a memory device and a method of operating the same capable of improving reliability.

According to an embodiment of the present disclosure, a memory device includes a memory block including a plurality of pages, a peripheral circuit configured to sequentially program the plurality of pages included in the memory block, and a control circuit configured to control the peripheral circuit so that the plurality of pages are sequentially programmed in a page unit. The control circuit checks an elapsed time between a program operation end time of a selected page among the plurality of pages and a time when a next page is selected, and changes a program operation type between a normal program operation and a dummy program operation to be performed on the next page according to the elapsed time.

According to an example of the present disclosure, a method of operating a memory device includes checking a first elapsed time between an end time of a program operation performed on a first page and a selection time when a second page is selected after the end time, comparing the first elapsed time with a reference time interval, and performing a dummy program operation on the second page when the first elapsed time is equal to or longer than the reference time interval.

According to an example of the present disclosure, a method of operating a memory device includes checking a first elapsed time between an end time of a program operation performed on a first page and a selection time when a second page is selected after the end time, comparing the first elapsed time with a reference time interval, programming dummy data in the second page when the first elapsed time is equal to or longer than the reference time interval, and programming normal data in the second page when the first elapsed time is shorter than the reference time interval.

According to an example of the present disclosure, a method of operating a memory device includes performing a first normal program operation of programming first normal data in a first page, checking a first elapsed time between an end time of the first normal program operation performed on the first page and a first selection time when a second page is selected, comparing the first elapsed time with a reference time interval, programming first dummy data in the second page when the first elapsed time is equal to or longer than the reference time interval, and programming second normal data in the second page when the first elapsed time is shorter than the reference time interval.

The present technology may improve reliability of a program operation, thereby improving reliability of a memory device.

BRIEF DESCRIPTION OF THE DRAWINGS

FIG. 5 is a flowchart illustrating a program operation according to a first embodiment of the present disclosure.

FIGS. 7 to 9 are flowcharts illustrating a program operation according to a second embodiment of the present disclosure.

FIG. 11 is a flowchart illustrating a program operation according to a third embodiment of the present disclosure.

DETAILED DESCRIPTION

Specific structural or functional descriptions disclosed below are exemplified to describe an embodiment according to the concept of the present disclosure. The embodiment according to the concept of the present disclosure is not construed as being limited to the embodiments described below, and may be variously modified and replaced with other equivalent embodiments.

Hereinafter, terms such as first and second may be used to describe various components, but the components are not limited by the terms. The terms are used for the purpose of distinguishing one component from another component and not to imply a number or order of components.

Figure 1:
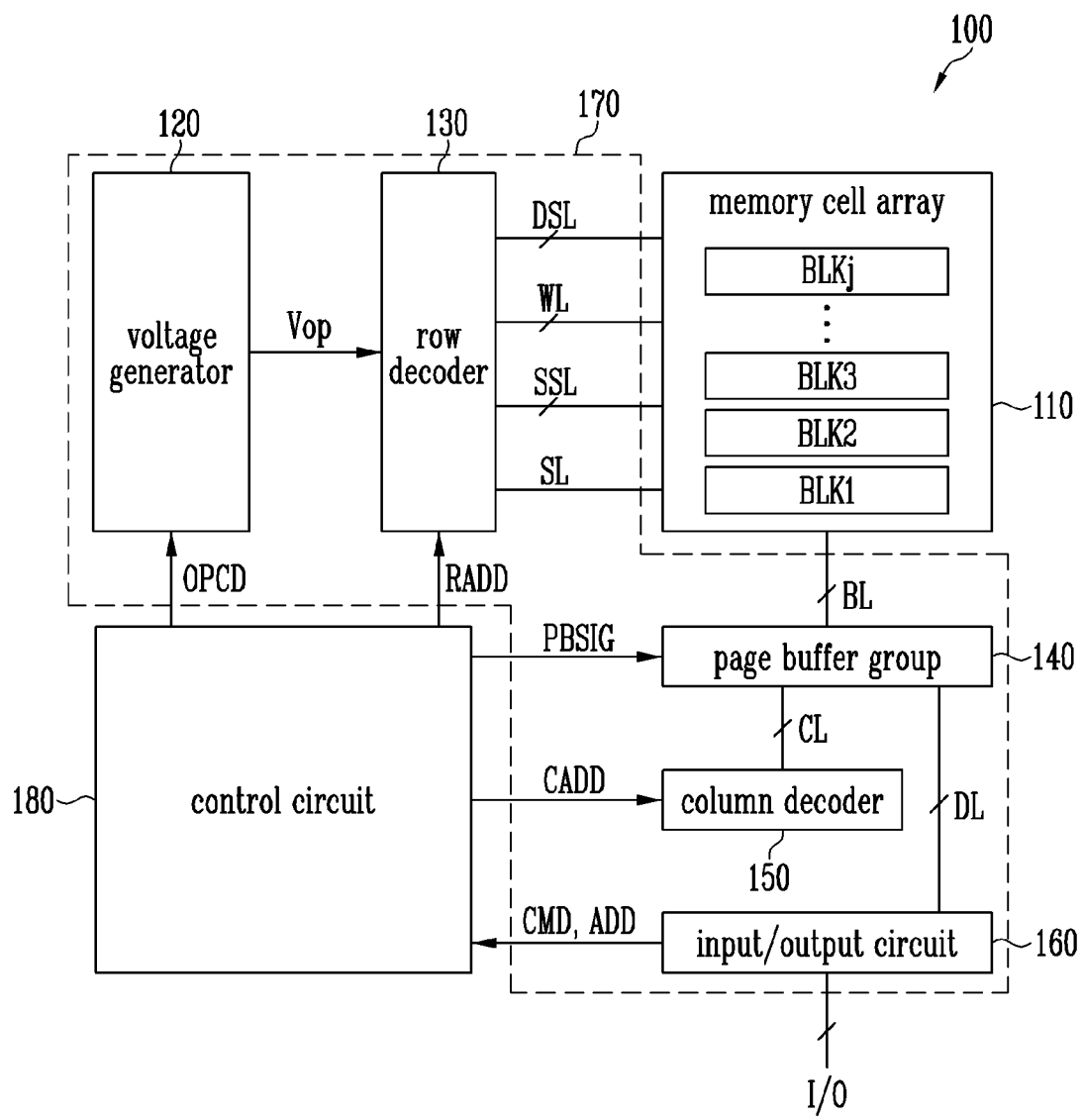
FIG. 1 is a diagram illustrating a memory device.

FIG. 1 is a diagram illustrating a memory device.

Referring to FIG. 1, the memory device 100 may include a memory cell array 110, a peripheral circuit 170, and a control circuit 180.

The memory cell array 110 may include first to j-th memory blocks BLK1 to BLKj. The first to j-th memory blocks BLK1 to BLKj may be formed in a three-dimensional structure. Each of the first to j-th memory blocks BLK1 to BLKj formed in the three-dimensional structure may include memory cells stacked on a substrate in a vertical direction.

The memory cells may store 1 bit or 2 bits or more of data according to a program method. For example, a method in which 1 bit of data is stored in one memory cell is referred to as a single-level cell method, and a method in which 2 bits of data is stored in one memory cell is referred to as a multi-level cell method. A method in which 3 bits of data is stored in one memory cell is referred to as a triple-level cell method, and a method in which 4 bits of data is stored in one memory cell is referred to as a quad-level cell method. In addition to this, five bits or more of data may be stored in one memory cell.

The peripheral circuit 170 may be configured to perform a program operation of storing data in the memory cell array 110, a read operation of outputting the data stored in the memory cell array 110, and an erase operation of erasing the data stored in the memory cell array 110. For example, the peripheral circuit 170 may include a voltage generator 120, a row decoder 130, a page buffer group 140, a column decoder 150, and an input/output circuit 160.

The voltage generator 120 may generate various operation voltages Vop used for the program operation, the read operation, or the erase operation in response to an operation code OPCD. For example, the voltage generator 120 may be configured to generate program voltages, pass voltages, turn on voltages, turn off voltages, ground voltages, a negative voltage, source voltages, verify voltages, read voltages, erase voltages, precharge voltages, and the like in response to the operation code OPCD.

The program voltages may be voltages applied to a selected word line among word lines WL during the program operation, and may be used to increase a threshold voltage of memory cells connected to the selected word line.

The pass voltages may be voltages applied to unselected word lines among the word lines WL during the program or read operation, and may be used to turn on memory cells connected to the unselected word lines.

The turn on voltages may be voltages applied to a drain select line DSL or a source select line SSL, and may be used to turn on drain select transistors or source select transistors. The turn off voltages may be voltages applied to the drain select line DSL or the source select line SSL, and may be used to turn off the drain select transistors or the source select transistors.

The ground voltage may be a 0V voltage, and the negative voltage may be a voltage lower than 0V. The source voltages may be voltages applied to a source line SL, and may be a negative voltage, a ground voltage, or a positive voltage.

The verify voltages may be voltages for determining a threshold voltage of selected memory cells during the program or erase operation, and may be applied to the selected word line or the selected word lines. The read voltages may be voltages applied to the selected word line during the read operation, and may be used to determine data stored in the memory cells.

The erase voltages may be voltages applied to the source line SL during the erase operation, and may be used to decrease the threshold voltage of the memory cells. The precharge voltage may be a positive voltage for precharging a channel of unselected strings during a verify operation or the read operation, and may be supplied to the source line SL.

The row decoder 130 may be connected to the voltage generator 120 through global lines, and may be connected to the first to j-th memory blocks BLK1 to BLKj through the drain select lines DSL, the word lines WL, the source select lines SSL, and the source line SL. The row decoder 130 may be configured to transmit the operation voltages Vop to the drain select lines DSL, the word lines WL, the source select lines SSL, and the source line SL connected to a selected memory block according to a row address RADD.

The page buffer group 140 may include page buffers (not shown) commonly connected to the first to j-th memory blocks BLK1 to BLKj. For example, each of the page buffers (not shown) may be connected to the first to j-th memory blocks BLK1 to BLKj through bit lines BL. The page buffers (not shown) may sense a current or a voltage of the bit lines BL in response to page buffer control signals PBSIG. During the program operation, the page buffers included in the page buffer group 140 may apply program allowable voltages or program inhibit voltages to the bit lines BL. For example, the page buffers included in the page buffer group 140 may selectively apply the program allowable voltages having various levels to the bit lines BL in response to the page buffer control signals PBSIG, and adjust a time when the allowable voltages are applied to the bit lines BL. In addition, the page buffers may simultaneously adjust the level of the program allowable voltages and the time when the program allowable voltages are applied to the bit lines BL. The page buffers may sequentially apply the program allowable voltages to the bit lines BL.

The column decoder 150 may be configured to transmit data between the page buffer group 140 and the input/output circuit 160 in response to a column address CADD. For example, the column decoder 150 may be connected to the page buffer group 140 through column lines CL and may transmit the data between the page buffers (not shown) included in the page buffer group 140 and the input/output circuit 160 by applying the enable signals to the column lines CL.

The input/output circuit 160 may be configured to receive or output a command CMD, an address ADD, or data through input/output lines I/O. For example, the input/output circuit 160 may transmit the command CMD and the address ADD received from an external controller to the control circuit 180 through the input/output lines I/O. The input/output circuit 160 may output data received from the page buffer group 140 to the external controller through the input/output lines I/O, or may transfer data received from the external controller to the page buffer group 140 through data lines DL.

The control circuit 180 may include hardware configured to output the operation code OPCD, the row address RADD, the page buffer control signals PBSIG, and the column address CADD in response to the command CMD and the address ADD, and software for executing various algorithms. When the command CMD input to the control circuit 180 is a command corresponding to the program operation, the control circuit 180 may control the peripheral circuit 170 to perform the program operation of the memory block selected by the address ADD, by executing a program algorithm. When the command CMD input to the control circuit 180 is a command corresponding to the read operation, the control circuit 180 may control the peripheral circuit 170 to perform the read operation of the memory block selected by the address and output the read data, by executing a read algorithm. When the command CMD input to the control circuit 180 is a command corresponding to the erase operation, the control circuit 180 may control the peripheral circuit 170 to perform the erase operation of the selected memory block, by executing an erase algorithm.

During the program operation of the selected memory block, the control circuit 180 may change the program operation type according to a time when a next page is selected after a program operation of a selected page has ended. For example, when an elapsed time from a time when the selected page is programmed to a time when the program operation of the next page is started is relatively long, a difference may occur in a threshold voltage of memory cells included in different pages, and thus a retention characteristic of the memory cells may be deteriorated. Therefore, in the present embodiment, to prevent a reduction of reliability of the memory device, a normal type program operation or a dummy type program operation may be performed on the next page according to the elapsed time. Regarding the different types of program operations, a normal program operation means an operation of programming normal data in a selected page. The normal data may be user data. A dummy program operation means an operation of programming dummy data in a selected page.

When the control circuit 180 determines that an elapsed time from a time when a program operation of a previous page has ended to a time when a next page is selected is shorter than a reference time, the control circuit 180 may control the peripheral circuit 170 to perform the normal program operation on the selected next page. When the control circuit 180 determines that the elapsed time from the program operation end time of the previously selected page to the time when the next page is selected is equal to or longer than the reference time, the control circuit 180 may control the peripheral circuit 170 to perform the dummy program operation on the next page. Normal data which is not programmed due to the dummy program may be programmed in the next page.

Figure 2:
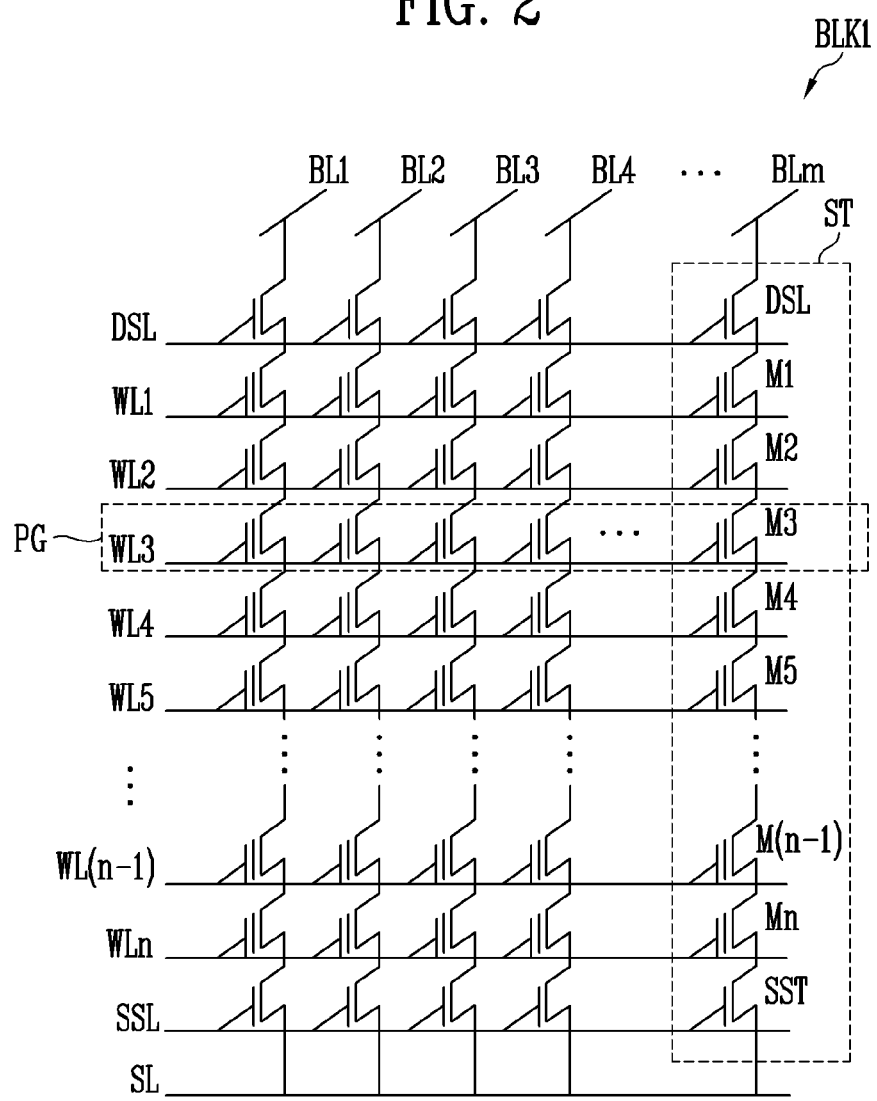
FIG. 2 is a diagram illustrating a memory block.

FIG. 2 is a diagram illustrating a memory block.

Referring to FIG. 2, the first memory block BLK1 among the first to j-th memory blocks BLK1 to BLKj shown in FIG. 1 is shown as an example.

The first memory block BLK1 may include strings ST connected between first to m-th bit lines BL1 to BLm and the source line SL. Each of the strings ST may include a drain select transistor DST, first to n-th memory cells M1 to Mn, and a source select transistor SST.

The first to n-th memory cells M1 to Mn included in the strings ST may be connected between the drain select transistors DST and the source select transistors SST. The drain select transistors DST included in the strings ST may be connected between the first memory cells M1 and the first to m-th bit lines BL1 to BLm. The source select transistors SST included in the strings ST may be connected between the n-th memory cells Mn and the source line SL.

Gates of drain select transistors DST connected to different strings ST may be connected to the drain select line DSL. Gates of first to n-th memory cells M1 to Mn connected to different strings ST may be connected to first to n-th word lines WL1 to WLn. Gates of source select transistors SST connected to different strings ST may be connected to the source select line SSL.

Although not shown in the drawings, the strings ST may further include dummy cells in addition to the first to n-th memory cells M1 to Mn. The dummy cells may be formed in an area where a difference occurs in an electrical characteristic within the strings ST. For example, the dummy cells may be formed between the first memory cells M1 and the drain select transistors DST, or may be formed between the n-th memory cells Mn and the source select transistors SST. Alternatively, according to a structure of the first memory block BLK1, the dummy cells may be formed between the first to n-th memory cells M1 to Mn. For example, the dummy cells may be formed in an area where a size difference between adjacent memory cells is relatively large.

A group of memory cells connected to the same word line becomes a page PG. The program operation or the read operation may be performed in a page unit. For example, during the program operation, when a page including the first memory cells M1 is selected and the first memory cells M1 are programmed, the second to n-th memory cells M2 to Mn included in remaining pages may be unselected. When the program operation of the page including the first memory cells M1 has ended, the program operation of the second memory cells M2 included in the next page may be performed. During the program operation, the pages may be sequentially selected from the drain select line DSL to the source select line SSL, but an order of the program operation may be changed according to the memory device.

Figure 3:
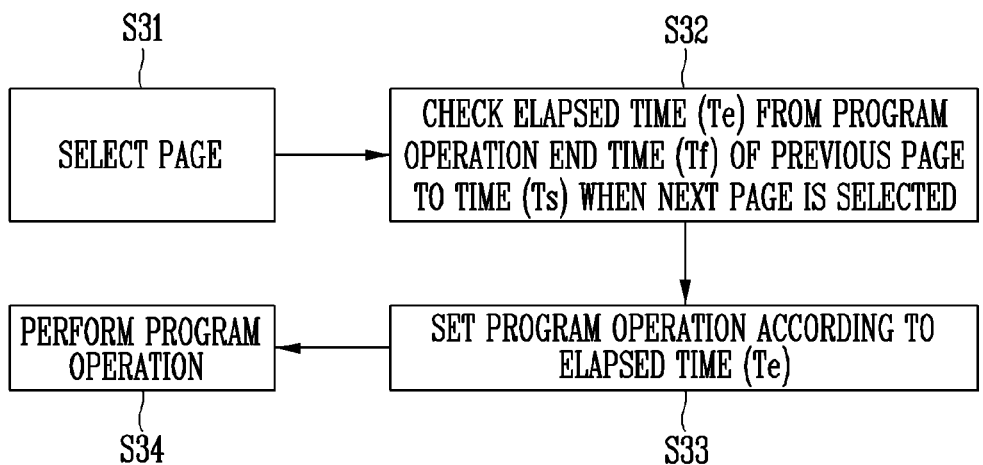
FIG. 3 is a flow diagram illustrating a program operation of the present disclosure.

FIG. 3 is a flow diagram illustrating a program operation of the present disclosure.

Referring to FIG. 3, the following steps may be performed to program the page.

In the page selection step S31, a page on which the program operation is to be performed may be selected.

When the page to be programmed is selected, checking an elapsed time Te from a program operation end time Tf of a previous page to a selection time Ts when a next page is selected (S32) may be performed. Here, the next page is the page selected in step S31. Therefore, the selection time Ts when the next page is selected is equal to a time when the page is selected in step S31.

Subsequently, setting the program operation according to the elapsed time Te (S33) may be performed. For example, by comparing the elapsed time Te with the reference time, when the elapsed time Te is shorter than the reference time, the normal program operation may be set. When the elapsed time Te is equal to or longer than the reference time, the dummy program operation may be set. When the normal program operation is set, the normal data may be input to the page buffer group 140 of FIG. 1, and voltages to be used in the normal program operation may be set. When the dummy program operation is set, the dummy data may be input to the page buffer group 140 of FIG. 1, and voltages to be used in the dummy program operation may be set. When a first page among pages included in the selected memory block is selected, the elapsed time Te may become 0, and thus the normal program operation may be set.

When the normal or dummy program operation is set, the program operation may be performed on the selected page according to the set operation (S34).

Figure 4:
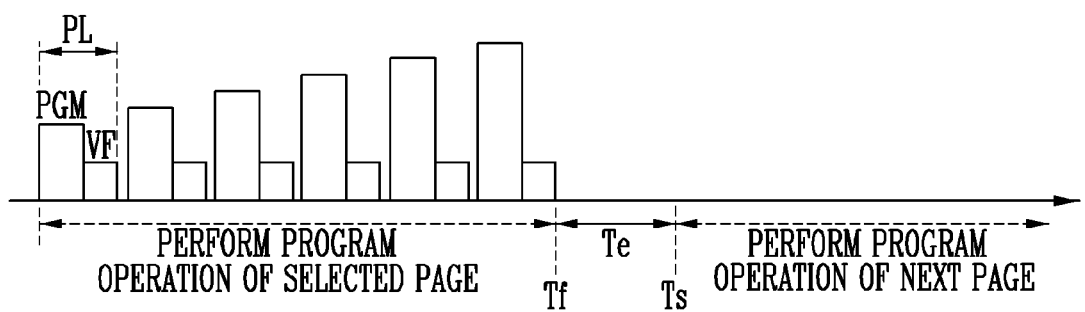
FIG. 4 is a diagram illustrating an elapsed time of the present disclosure.

FIG. 4 is a diagram illustrating the elapsed time of the present disclosure.

Referring to FIG. 4, a plurality of program loops PL may be performed in the program operation of the selected page. Each of the program loops PL may include a program step PGM and a verify step VF. In the program step PGM, the program voltage may be applied to the selected word line. In the verify step VF, it may be determined whether the programming of memory cells included in the selected page is completed. For example, when the program voltage is applied to the selected word line in the program step PGM, the threshold voltage of the selected memory cells connected to the selected word line may be increased. When the verify voltage is applied to the selected word line in the verify step VF, it may be determined whether the threshold voltage of the selected memory cells included in the selected page is increased to a target voltage. When cells of which a threshold voltage is lower than the target voltage are detected among the selected memory cells included in the selected page, a next program loop may be performed. When all threshold voltages of the selected memory cells included in the selected page are increased to the target voltage, the program operation of the selected page may be ended. At this time, the program operation end time Tf of the selected page may be checked. Subsequently, the next page may be selected, and the program operation to be performed on the selected next page may be set. When the next page is selected, the selection time Ts when the next page is selected may be checked. The elapsed time Te may be an elapsed time from the program operation end time Tf of the selected page to the selection time Ts when the next page is selected.

The elapsed time Te may be maintained constant in a normal situation. However, when an error occurs in the control circuit 180 of FIG. 1 or a loading time of the memory device increases, the elapsed time Te may become longer.

When the elapsed time Te is equal to or longer than the reference time, reliability of the program operation performed on the next page may be reduced, and thus the dummy program operation for storing the dummy data in the next page may be performed in the present embodiment.

FIG. 5 is a flowchart illustrating a program operation according to a first embodiment of the present disclosure.

Referring to FIG. 5, a program operation of an (N−1)-th page may be performed (S51). When the program operation of the (N−1)-th page has ended, an N-th page may be selected (S52). When the N-th page is selected, the control circuit 180 of FIG. 1 may check an elapsed time Te from a program operation end time of the (N−1)-th page to a time when the N-th page is selected (S53). When the elapsed time Te is checked, the control circuit 180 may compare the elapsed time Te with a reference time Tr (S54). The reference time Tr may be a time interval pre-stored in the control circuit 180 and may vary according to the memory device.

In step S54, when the elapsed time Te is shorter than the reference time Tr (Yes), the control circuit 180 may control the peripheral circuit 170 of FIG. 1 to perform the normal program operation in the N-th page (S55).

In step S54, when the elapsed time Te is equal to or longer than the reference time Tr (No), the control circuit 180 may control the peripheral circuit 170 of FIG. 1 to perform the dummy program operation in the N-th page (S56).

Figure 6A:
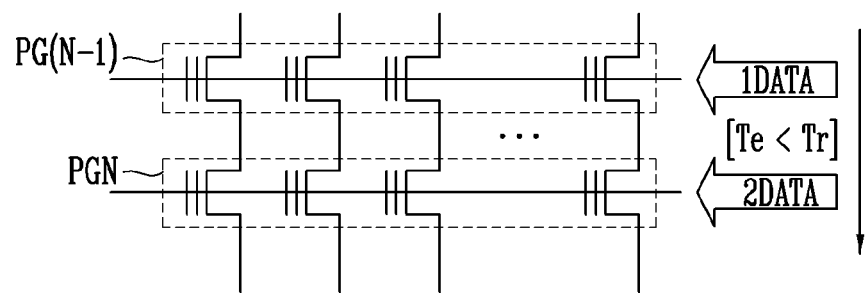
FIGS. 6A and 6B are diagrams illustrating data stored in pages during the program operation according to the first embodiment.
Figure 6B:
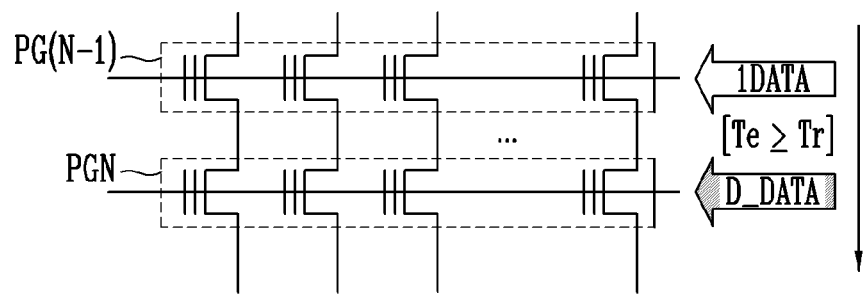

FIGS. 6A and 6B are diagrams illustrating data stored in pages during the program operation according to the first embodiment.

FIG. 6A is a diagram illustrating data programmed in the N-th page PGN when the elapsed time Te is shorter than the reference time Tr ('Yes' of step S54 of FIG. 5), and FIG. 6B is a diagram illustrating data programmed in the N-th page PGN when the elapsed time Te is equal to or longer than the reference time Tr ('No' of step S54 of FIG. 5).

Referring to FIGS. 5 and 6A, after the normal program operation of storing first data 1DATA in an (N−1)-th page PG(N−1) is performed, when an elapsed time Te until an N-th page PGN is selected is shorter than the reference time Tr, the normal program operation may be set as a program operation to be performed on the N-th page PGN. Accordingly, second data 2DATA may be programmed in the N-th page PGN. The second data 2DATA may be data successive to the first data 1DATA.

Referring to FIGS. 5 and 6B, after the normal program operation of storing the first data 1DATA in the (N−1)-th page PG(N−1) is performed, when the elapsed time Te until the N-th page PGN is selected is equal to or later than the reference time Tr, the dummy program operation may be set as the program operation to be performed on the N-th page PGN. Accordingly, dummy data D_DATA other than the second data 2DATA may be programmed in the N-th page PGN. The dummy data D_DATA may be data unrelated to the user data or the normal data, and may be random data.

Figure 7:
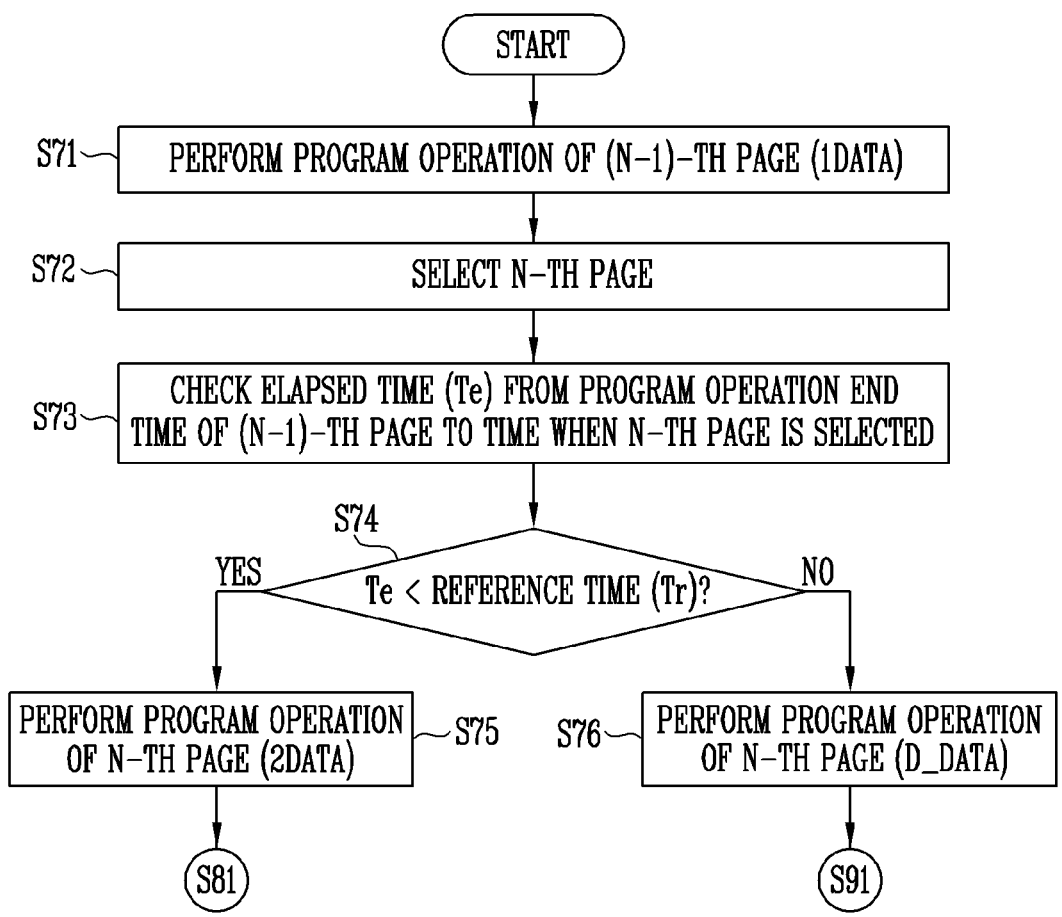
Figure 8:
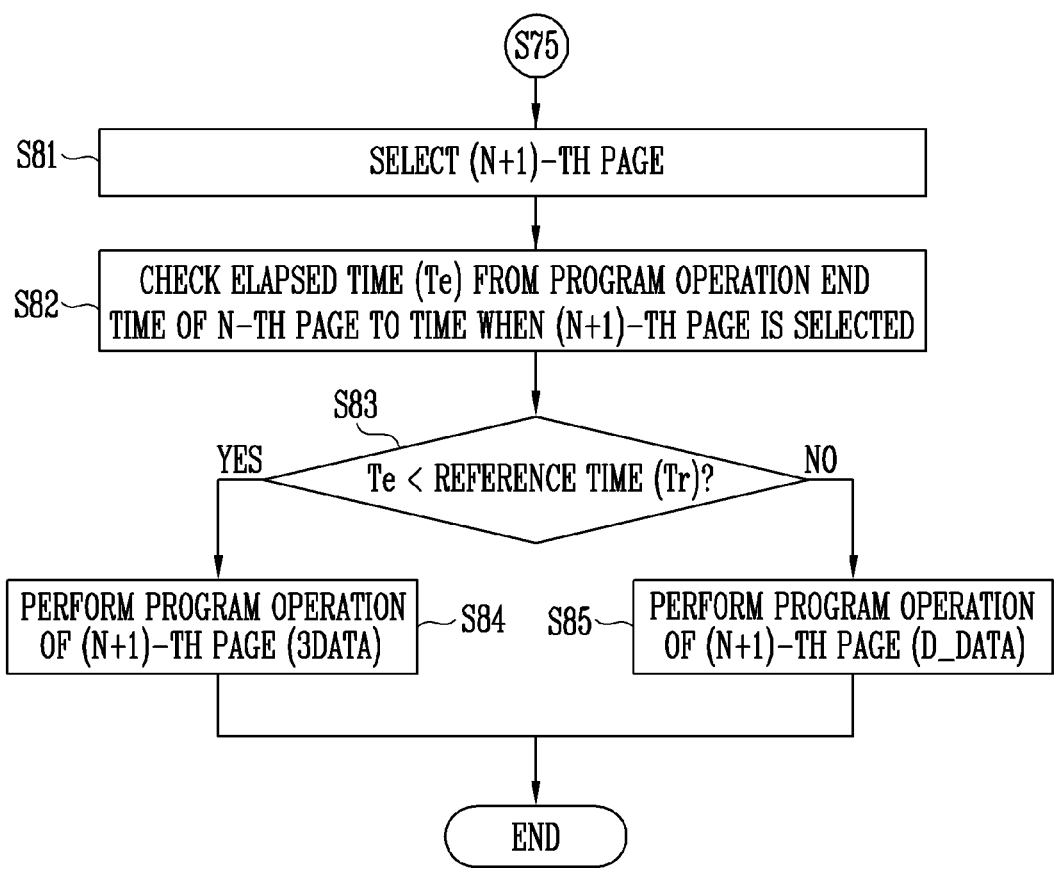

FIGS. 7 to 9 are flowcharts illustrating a program operation according to a second embodiment of the present disclosure.

Referring to FIG. 7, the program operation of the (N−1)-th page may be performed (S71). It is assumed that the first data 1DATA is stored in the (N−1)-th page. The first data 1DATA may be the user data or the normal data.

When the program operation of the (N−1)-th page has ended, the N-th page may be selected (S72). When the N-th page is selected, the control circuit 180 of FIG. 1 may check the elapsed time Te from the program operation end time of the (N−1)-th page to the time when the N-th page is selected (S73). When the elapsed time Te is checked, the control circuit 180 may compare the elapsed time Te with the reference time Tr (S74). The reference time Tr may be a time interval pre-stored in the control circuit 180 and may vary according to the memory device.

In step S74, when the elapsed time Te is shorter than the reference time Tr (Yes), the control circuit 180 may control the peripheral circuit 170 of FIG. 1 to perform the normal program operation in the N-th page (S75). When the normal program operation is performed in the N-th page, the second data 2DATA successive from the first data 1DATA may be programmed in the N-th page. Steps performed after step S75 are described with reference to FIG. 8.

In step S74, when the elapsed time Te is equal to or longer than the reference time Tr (No), the control circuit 180 may control the peripheral circuit 170 of FIG. 1 to perform the dummy program operation in the N-th page (S76). When the dummy program operation is performed in the N-th page, the dummy data D_DATA unrelated to the second data 2DATA may be programmed in the N-th page PGN. Steps performed after step S76 are described with reference to FIG. 9.

Referring to FIGS. 7 and 8, when the normal program operation performed in step S75 has ended, an (N+1)-th page, which is the next page, may be selected (S81). When the (N+1)-th page is selected, the control circuit 180 of FIG. 1 may check the elapsed time Te from a program operation end time of the N-th page to a time when the (N+1)-th page is selected (S82). The elapsed time Te checked in step S82 may be different from the elapsed time Te checked in step S73. When the elapsed time Te is checked in step S82, the control circuit 180 may compare the elapsed time Te with the reference time Tr (S83). The reference time Tr may be a time interval pre-stored in the control circuit 180 and may vary according to the memory device.

In step S83, when the elapsed time Te is shorter than the reference time Tr (Yes), the control circuit 180 may control the peripheral circuit 170 of FIG. 1 to perform the normal program operation in the (N+1)-th page (S84). In step S75, the second data 2DATA is programmed in the N-th page, third data 3DATA successive to the second data 2DATA may be programmed in the (N+1)-th page in step S84.

In step S83, when the elapsed time Te is equal to or longer than the reference time Tr (No), the control circuit 180 may control the peripheral circuit 170 of FIG. 1 to perform the dummy program operation in the (N+1)-th page (S85). When the dummy program operation is performed in the (N+1)-th page, the dummy data D_DATA unrelated to the third data 3DATA may be programmed in the (N+1)-th page. The dummy data D_DATA programmed in the (N+1)-th page in step S85 may be equal to or different from the dummy data D_DATA programmed in the N-th page in step S76.

Referring to FIGS. 7 and 9, when the dummy program operation performed in step S76 has ended, the (N+1)-th page, which is the next page, may be selected (S91). When the (N+1)-th page is selected, the control circuit 180 of FIG. 1 may check the elapsed time Te from the program operation end time of the N-th page to the time when the (N+1)-th page is selected (S92). The elapsed time Te checked in step S92 may be different from the elapsed time Te checked in step S73. When the elapsed time Te is checked in step S92, the control circuit 180 may compare the elapsed time Te with the reference time Tr (S93). The reference time Tr may be a time interval pre-stored in the control circuit 180 and may vary according to the memory device.

In step S93, when the elapsed time Te is shorter than the reference time Tr (Yes), the control circuit 180 may control the peripheral circuit 170 of FIG. 1 to perform the normal program operation in the (N+1)-th page (S94). Because the dummy data D_DATA is programmed in the N-th page in step S76, the second data 2DATA successive from the first data 1DATA may be programmed in the (N+1)-th page in step S94.

In step S93, when the elapsed time Te is equal to or longer than the reference time Tr (No), the control circuit 180 may control the peripheral circuit 170 of FIG. 1 to perform the dummy program operation in the (N+1)-th page (S95). When the dummy program operation is performed in the (N+1)-th page, the dummy data D_DATA unrelated to the second data 2DATA may be programmed in the (N+1)-th page. The dummy data D_DATA programmed in the (N+1)-th page in step S95 may be equal to or different from the dummy data D_DATA programmed in the N-th page in step S76.

Figure 10A:
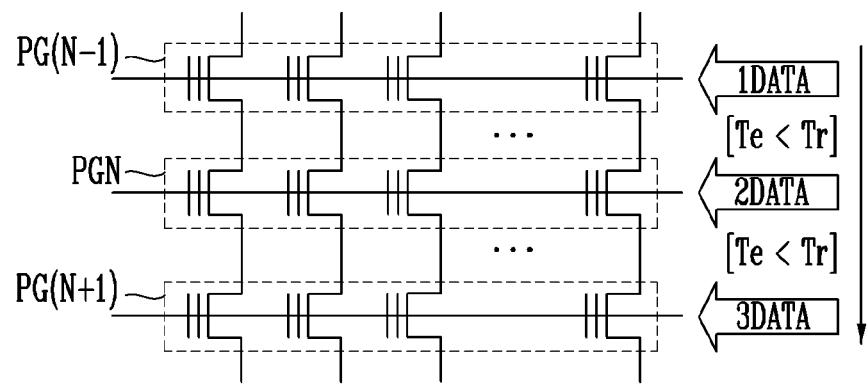
FIGS. 10A and 10B are diagrams illustrating data stored in pages during the program operation according to the second embodiment.
Figure 10B:
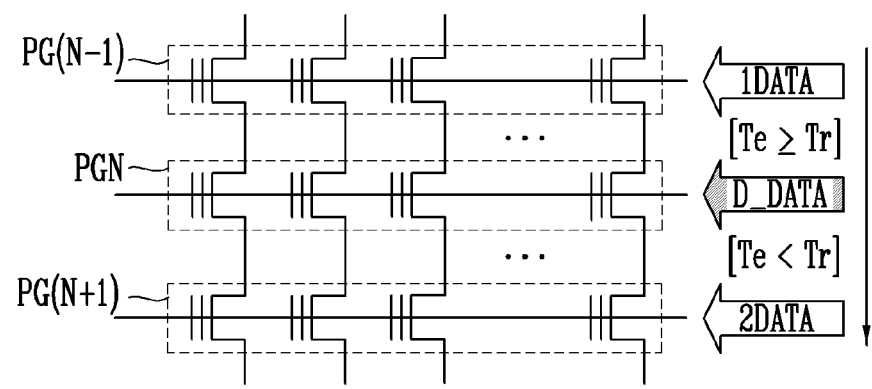

FIGS. 10A and 10B are diagrams illustrating data stored in pages during the program operation according to the second embodiment.

FIG. 10A is a diagram illustrating data programmed in the (N−1)-th, N-th, and (N+1)-th pages PG(N−1), PGN, and PG(N+1) when the elapsed time Te between the (N−1)-th, N-th, and (N+1)-th pages is shorter than the reference time Tr ('Yes' of step S74 of FIG. 7 and 'Yes' of step S83 of FIG. 8), and FIG. 10B is a diagram illustrating data programmed in the (N−1)-th, N-th, and (N+1)-th pages PG(N−1), PGN, and PG(N+1) when the elapsed time Te is shorter than the reference time Tr ('Yes' of step S74 of FIG. 7 and 'Yes' of step S93 of FIG. 9) in a partial period of the elapsed times Te between the (N−1)-th, N-th, and (N+1)-th pages.

Referring to FIGS. 7, 8, and 10A, after the normal program operation of storing the first data 1DATA in the (N−1)-th page PG(N−1) is performed, when the elapsed time Te until the N-th page PGN is selected is shorter than the reference time Tr, the normal program operation may be set as the program operation to be performed on the N-th page PGN. Accordingly, the second data 2DATA may be programmed in the N-th page PGN. The second data 2DATA may be data successive to the first data 1DATA.

After the normal program operation of storing the second data 2DATA in the N-th page PGN is performed, the elapsed time Te until the (N+1)-th page PG(N+1) is selected is shorter than the reference time Tr, the normal program operation may be set as a program operation to be performed on the (N+1)-th page (PG(N+1)). Accordingly, the third data 3DATA may be programmed in the (N+1)-th page PG(N+1). The third data 3DATA may be data successive to the second data 2DATA.

Referring to FIGS. 5, 9, and 10B, after the normal program operation of storing the first data 1DATA in the (N−1)-th page PG(N−1) is performed, when the elapsed time Te until the N-th page PGN is selected is equal to or later than the reference time Tr, the dummy program operation may be set as the program operation to be performed on the N-th page PGN. Accordingly, the dummy data D_DATA may be programmed in the N-th page PGN.

After the dummy program operation of storing the dummy data D_DATA in the N-th page PGN is performed, the elapsed time Te until the (N+1)-th page PG(N+1) is selected is shorter than the reference time Tr, the normal program operation may be set as the program operation to be performed on the (N+1)-th page (PG(N+1)). Accordingly, the second data 2DATA that is not programmed in the N-th page PGN may be programmed in the (N+1)-th page PG(N+1). The second data 2DATA may be data successive to the first data 1DATA.

FIG. 11 is a flowchart illustrating a program operation according to a third embodiment of the present disclosure.

Referring to FIG. 11, the N-th page may be selected for the program operation (S111). When the N-th page is selected, the control circuit 180 of FIG. 1 may check the elapsed time Te from the program operation end time of the (N−1)-th page to the time when the N-th page is selected (S112). When the elapsed time Te is checked, the control circuit 180 may compare the elapsed time Te with the reference time Tr (S113). The reference time Tr may be a time interval pre-stored in the control circuit 180 and may vary according to the memory device.

In step S113, when the elapsed time Te is shorter than the reference time Tr (Yes), the control circuit 180 may set the normal program operation as the program operation to be performed in the N-th page (S114), control the peripheral circuit 170 of FIG. 1 to perform the normal program operation of the N-th page (S115). Because the normal program operation is performed in the N-th page, the normal data may be programmed in the N-th page.

In step S113, when the elapsed time Te is equal to or longer than the reference time Tr (No), the control circuit 180 may set the dummy program operation as the program operation to be performed in the N-th page (S116), and control the peripheral circuit 170 of FIG. 1 to perform the dummy program operation of the N-th page (S117). Because the dummy program operation is performed in the N-th page, the dummy data D_DATA may be programmed in the N-th page.

When the program operation of step S115 or S117 has ended, the control circuit 180 of FIG. 1 may determine whether the N-th page is a last page (S118). When the N-th page among the pages included in the selected memory block is not the last page (No), a value greater than N by 1 is set to N (S119), and the N-th page, which is the next page, may be selected (S111).

Steps S111 to S119 may be repeated until the N-th page becomes the last page in step S118 (Yes).

Figure 12:
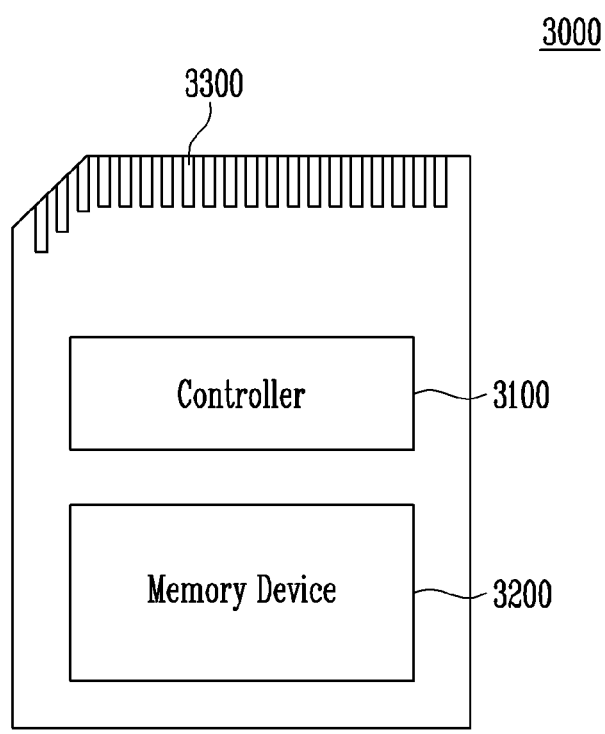
FIG. 12 is a diagram illustrating a memory card system to which a memory device of the present disclosure is applied.

FIG. 12 is a diagram illustrating a memory card system 3000 to which a memory device of the present disclosure is applied.

Referring to FIG. 12, the memory card system 3000 includes a controller 3100, a memory device 3200, and a connector 3300.

The controller 3100 is connected to the memory device 3200. The controller 3100 is configured to access the memory device 3200. For example, the controller 3100 may be configured to control a program, read, or erase operation of the memory device 3200 or to control a background operation. The controller 3100 is configured to provide an interface between the memory device 3200 and a host. The controller 3100 is configured to drive firmware for controlling the memory device 3200. For example, the controller 3100 may include components such as a random-access memory (RAM), a processing unit, a host interface, a memory interface, and an error correction circuit.

The controller 3100 may communicate with an external device through the connector 3300. The controller 3100 may communicate with an external device (for example, the host) according to a specific communication standard. For example, the controller 3100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 3300 may be defined by at least one of the various communication standards described above.

The memory device 3200 may include a plurality of memory cells, and may be configured identically to the memory device 100 shown in FIG. 1. Therefore, the memory device 3200 may adjust the pass voltages applied to the unselected word lines during the read operation as in the embodiments described above.

The controller 3100 and the memory device 3200 may be integrated into one semiconductor device to configure a memory card. For example, the controller 3100 and the memory device 3200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 13:
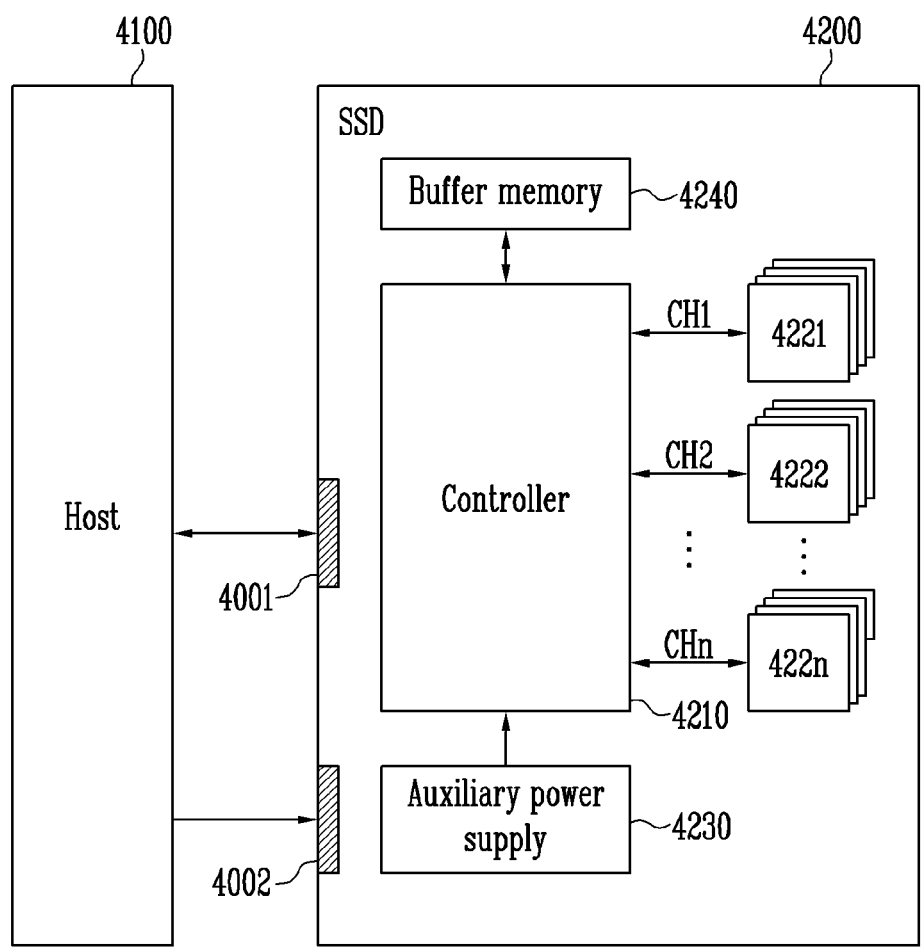
FIG. 13 is a diagram illustrating a solid-state drive (SSD) system to which a memory device of the present disclosure is applied.

FIG. 13 is a diagram illustrating a solid state drive (SSD) system 4000 to which memory devices of the present disclosure are applied.

Referring to FIG. 13, the SSD system 4000 includes a host 4100 and an SSD 4200. The SSD 4200 exchanges a signal with the host 4100 through a signal connector 4001 and receives power through a power connector 4002. The SSD 4200 includes a controller 4210, a plurality of memory devices 4221 to 422n, an auxiliary power supply 4230, and a buffer memory 4240.

The controller 4210 may control the plurality of memory devices 4221 to 422n in response to the signal received from the host 4100. For example, the signal may be signals based on an interface between the host 4100 and the SSD 4200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The plurality of memory devices 4221 to 422n may include a plurality of memory cells configured to store data. Each of the plurality of memory devices 4221 to 422n may be configured identically to the memory device 100 shown in FIG. 1. Therefore, during the read operation, each of the plurality of memory devices 4221 to 422n may adjust the pass voltages applied to the unselected word lines as in the embodiments described above.

The auxiliary power supply 4230 is connected to the host 4100 through the power connector 4002. The auxiliary power supply 4230 may receive a power voltage from the host 4100 and charge the power voltage. The auxiliary power supply 4230 may provide a power voltage of the SSD 4200 when power supply from the host 4100 is not smooth. For example, the auxiliary power supply 4230 may be positioned in the SSD 4200 or may be positioned outside the SSD 4200. For example, the auxiliary power supply 4230 may be positioned on a main board and may provide auxiliary power to the SSD 4200.

The buffer memory 4240 operates as buffer memory of the SSD 4200. For example, the buffer memory 4240 may temporarily store data received from the host 4100 or data received from the memory devices 4221 to 422n, or may temporarily store metadata (for example, a mapping table) of the memory devices 4221 to 422n. The buffer memory 4240 may include volatile memory such as DRAM, SDRAM, DDR SDRAM, and LPDDR SDRAM, or nonvolatile memory such as FRAM, a ReRAM, STT-MRAM, and PRAM.

What is claimed is:

1. A method of operating a memory device, the method comprising:
checking a first elapsed time between an end time of a program operation performed on a first page and a selection time when a second page is selected after the end time;
comparing the first elapsed time with a reference time interval; and
performing a dummy program operation on the second page when the first elapsed time is equal to or longer than the reference time interval.

2. The method of claim 1, wherein checking the first elapsed time comprises:
checking the end time of the program operation performed on the first page;
checking the selection time when the second page is selected; and
determining as the first elapsed time the time interval between the end time of the program operation performed on the first page and the selection time when the second page is selected.

3. The method of claim 1, wherein dummy data is stored in the second page by the dummy program operation.

4. The method of claim 1, wherein a normal program operation is performed on the second page when the first elapsed time is shorter than the reference time.

5. The method of claim 4, wherein normal data is stored in the second page by the normal program operation.

6. The method of claim 1, further comprising after performing the dummy program operation on the second page:
checking a second elapsed time between an end time of the dummy program operation performed in the second page and a selection time when a third page is selected after the end time of the dummy program operation;
comparing the second elapsed time with the reference time interval;
performing a dummy program operation on the third page when the second elapsed time is equal to or longer than the reference time interval; and
performing a normal program operation on the third page when the second elapsed time is shorter than the reference time interval.

7. A method of operating a memory device, the method comprising:
checking a first elapsed time between an end time of a program operation performed on a first page and a selection time when a second page is selected after the end time;
comparing the first elapsed time with a reference time interval;
programming dummy data in the second page when the first elapsed time is equal to or longer than the reference time interval; and
programming normal data in the second page when the first elapsed time is shorter than the reference time interval.

8. The method of claim 7, wherein checking the first elapsed time comprises:
checking the end time of the program operation performed on the first page;
checking the selection time when the second page is selected; and
determining as the first elapsed time the time interval between the end time of the program operation performed on the first page and the selection time when the second page is selected.

9. The method of claim 7, further comprising after programming the dummy data or the normal data in the second page:
checking a second elapsed time between a time when the dummy data or normal data is finished being programmed in the second page and a time when a third page is selected;
comparing the second elapsed time with the reference time interval;
programming the dummy data in the third page when the second elapsed time is equal to or longer than the reference time interval; and
programming the normal data in the third page when the second elapsed time is shorter than the reference time interval.

10. A method of operating a memory device, the method comprising:
performing a first normal program operation of programming first normal data in a first page;
checking a first elapsed time between an end time of the first normal program operation performed on the first page and a first selection time when a second page is selected;
comparing the first elapsed time with a reference time interval;
programming first dummy data in the second page when the first elapsed time is equal to or longer than the reference time interval; and
programming second normal data in the second page when the first elapsed time is shorter than the reference time interval.

11. The method of claim 10, wherein the second normal data is different from the first normal data.

12. The method of claim 10, wherein the second normal data is successive data from the first normal data.

13. The method of claim 10, further comprising after programming the first dummy data or the second normal data in the second page:
checking a second elapsed time between a time when the first dummy data or the second normal data is finished being programmed in the second page and a time when a third page is selected;
comparing the second elapsed time with the reference time interval;
programming second dummy data in the third page when the second elapsed time is equal to or longer than the reference time interval; and
programming third normal data in the third page when the second elapsed time is shorter than the reference time interval.

14. The method of claim 13, wherein the second dummy data is the same as the first dummy data.

15. The method of claim 13, wherein the second dummy data is different from the first dummy data.

16. The method of claim 13, wherein the third normal data is different from the first and second normal data.

* * * * *